US012659601B2

(12) United States Patent
Watanabe

(10) Patent No.: US 12,659,601 B2
(45) Date of Patent: Jun. 16, 2026

(54) IMAGE PROCESSING APPARATUS, METHOD AND STORAGE MEDIUM THAT OBTAIN A FIRST LOOKUP TABLE (LUT) FOR A PREDETERMINED FORMAT CONVERSION AND APPLY AN EFFECT OF A DESIRED COLOR CONVERSION

(71) Applicant: CANON KABUSHIKI KAISHA, Tokyo (JP)

(72) Inventor: Jun Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/585,829

(22) Filed: Feb. 23, 2024

(65) Prior Publication Data
US 2024/0298094 A1 Sep. 5, 2024

(30) Foreign Application Priority Data
Mar. 1, 2023 (JP) ................................. 2023-031317

(51) Int. Cl.
H04N 23/85 (2023.01)
H04N 1/60 (2006.01)
H04N 9/67 (2023.01)

(52) U.S. Cl.
CPC ............... H04N 23/85 (2023.01); H04N 1/60 (2013.01); H04N 9/67 (2013.01)

(58) Field of Classification Search
None
See application file for complete search history.

(56) References Cited

U.S. PATENT DOCUMENTS

| | | | | |
|---|---|---|---|---|
| 11,516,429 | B2 * | 11/2022 | Diggins ................... | G06T 1/00 |
| 2015/0110398 | A1 | 4/2015 | Totsuka et al. | |
| 2017/0353627 | A1 * | 12/2017 | Yamada ................... | G06T 5/20 |
| 2019/0114518 | A1 * | 4/2019 | Matsuzaki ......... | G06K 15/1878 |
| 2019/0188883 | A1 * | 6/2019 | Takasumi ................ | H04N 9/69 |
| 2020/0077069 | A1 * | 3/2020 | Morotomi ........... | H04N 19/146 |
| 2023/0336879 | A1 * | 10/2023 | Mohtasham ............. | G09G 5/06 |
| 2025/0080862 | A1 * | 3/2025 | Xiao ...................... | H04N 23/84 |

FOREIGN PATENT DOCUMENTS

JP 2012-165147 8/2012

* cited by examiner

*Primary Examiner* — Twyler L Haskins
*Assistant Examiner* — Wesley J Chiu
(74) *Attorney, Agent, or Firm* — Venable LLP

(57) ABSTRACT

An image processing apparatus that functions as a first obtaining unit to obtain a first lookup table (LUT) for a predetermined format conversion and to apply an effect of a desired color conversion, a second obtaining unit to obtain a second LUT for applying an effect of the predetermined format conversion, of an effect of the first LUT, a setting unit to set an influence of an LUT to be applied to a first image for processing, a combining unit to combine the first LUT and the second LUT on a basis of the influence to generate a third LUT, and a processing unit to perform color conversion on the first image using the third LUT. The predetermined format conversion includes a first partial format conversion and a second partial format conversion, and the combining unit generates a fourth LUT without the second partial format conversion from the first LUT.

14 Claims, 5 Drawing Sheets

FIG. 2

F I G. 3
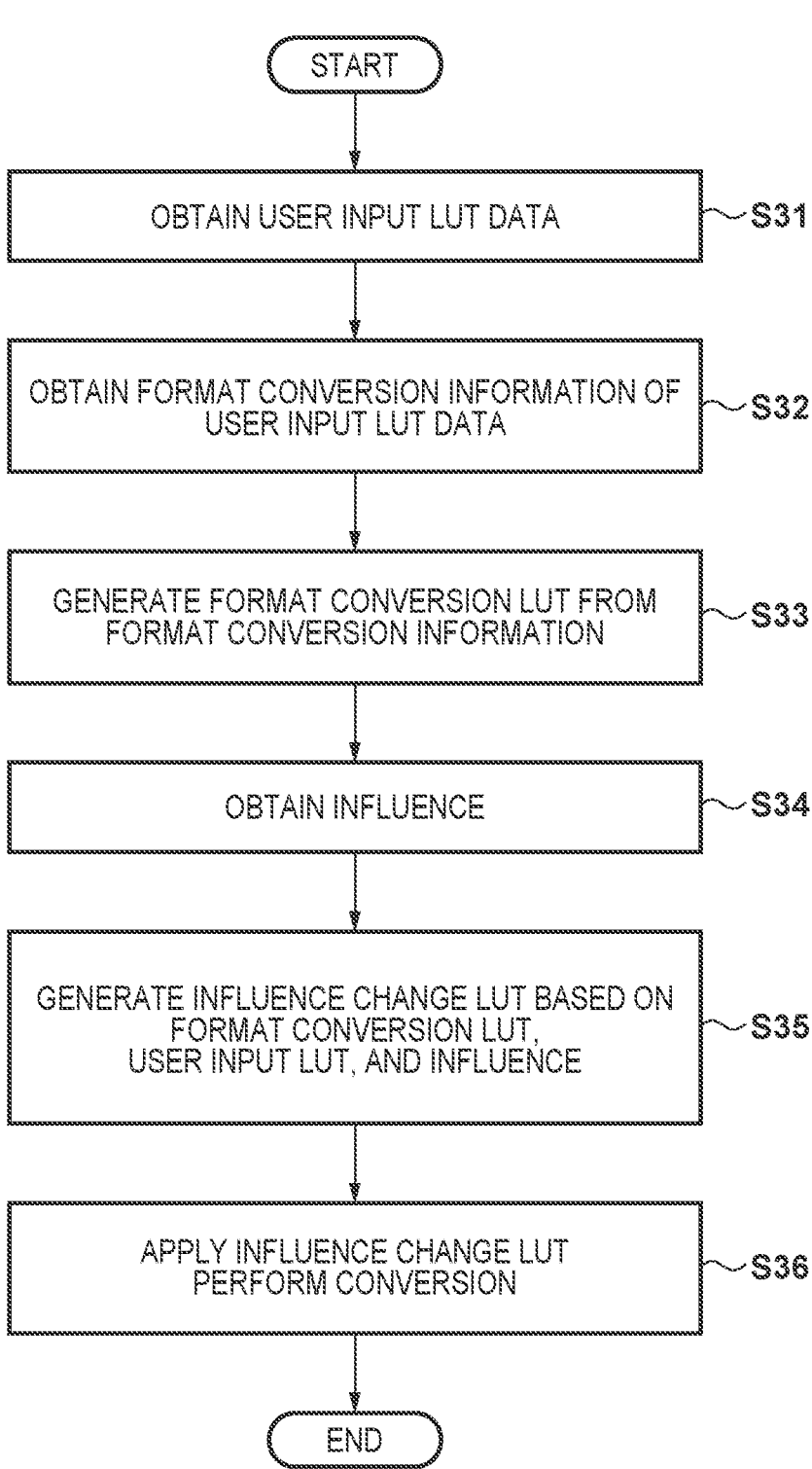
START
OBTAIN USER INPUT LUT DATA ～S31
OBTAIN FORMAT CONVERSION INFORMATION OF USER INPUT LUT DATA ～S32
GENERATE FORMAT CONVERSION LUT FROM FORMAT CONVERSION INFORMATION ～S33
OBTAIN INFLUENCE ～S34
GENERATE INFLUENCE CHANGE LUT BASED ON FORMAT CONVERSION LUT, USER INPUT LUT, AND INFLUENCE ～S35
APPLY INFLUENCE CHANGE LUT PERFORM CONVERSION ～S36
END

FIG. 4A

| R | G | B |
|---|---|---|
| 0.0000 | 0.0000 | 0.0000 |
| 0.0034 | 0.0000 | 0.0000 |
| 0.0125 | 0.0000 | 0.0000 |
| 0.0399 | 0.0000 | 0.0000 |
| 0.1137 | 0.0000 | 0.0000 |
| ⋮ | ⋮ | ⋮ |
| 0.0000 | 0.3503 | 0.0221 |
| 0.0004 | 0.3450 | 0.0198 |
| 0.3406 | 0.3300 | 0.0134 |
| 0.7047 | 0.2839 | 0.0000 |
| 1.0000 | 0.0656 | 0.0000 |
| ⋮ | ⋮ | ⋮ |

| R | G | B |
|---|---|---|
| 0.0000 | 0.0000 | 0.0000 |
| 0.0885 | 0.0025 | 0.0057 |
| 0.2441 | 0.0010 | 0.0122 |
| 0.4853 | 0.0000 | 0.0269 |
| 0.7589 | 0.0045 | 0.0482 |
| ⋮ | ⋮ | ⋮ |
| 0.6852 | 1.0000 | 0.7134 |
| 0.8624 | 1.0000 | 0.8068 |
| 1.0000 | 1.0000 | 1.0000 |
| 1.0000 | 1.0000 | 1.0000 |
| 1.0000 | 1.0000 | 1.0000 |
| ⋮ | ⋮ | ⋮ |

402

IMAGE PROCESSING APPARATUS, METHOD AND STORAGE MEDIUM THAT OBTAIN A FIRST LOOKUP TABLE (LUT) FOR A PREDETERMINED FORMAT CONVERSION AND APPLY AN EFFECT OF A DESIRED COLOR CONVERSION

CROSS REFERENCE TO PRIORITY APPLICATION

This application claims the benefit of Japanese Patent Application No. 2023-031317, filed Mar. 1, 2023, which is hereby incorporated by reference herein in its entirety.

BACKGROUND OF THE INVENTION

Field of the Invention

The present invention relates to a technique for executing image processing using a look-up table.

Description of the Related Art

A look-up table (hereafter, LUT) is commonly used as a way to correct the color and contrast of an image. Also, with cameras, LUTs incorporated from an external source are applied to captured images.

One example of an application of LUTs is the correction of the color or gray levels (hereafter, look conversion) for image generation. A user can use a self-made LUT or a LUT that is publicly available on the Web, or the like, to easily apply conversion to an image captured by a camera. However, how the color and gray levels are perceived is subjective, and there is no guarantee that the LUT effect suits every user. Thus, there is a demand to be able to adjust the level of the LUT effect.

Japanese Patent Laid-Open No. 2012-165147 describes a technique for adjusting the LUT effect. Specifically, Japanese Patent Laid-Open No. 2012-165147 describes a technique in which scene detection is performed and the correction tables for each scene are combined according to the reliability of the scenes corresponding to candidates.

In the Japanese Patent Laid-Open No. 2012-165147, a camera performs the scene determination, and then the camera adjusts the correction table. Accordingly, there is no guarantee that the correction table results in a conversion that matches the preference of the user. Another example of an LUT application other than look conversion is performing a format conversion for converting gamma/color gamut. For example, when converting an image based on PQ of ITU-R BT.2100 to an image based on ITU-R BT.709, format conversion can be performed by applying an LUT with the result of this conversion. Also, a format conversion result and a look conversion result can both be included in one LUT. In the case of adjusting the level of the result in such an LUT, preferably, only the look conversion level is able to be adjusted while the format conversion effect is maintained without change.

As described in the example above, that is, in the case of adjusting the result of conversion for image generation, the effect of format conversion needs to be taken into account.

SUMMARY OF THE INVENTION

The present invention in its first aspect provides an image processing apparatus comprising at least one processor and/or circuit; and at least one memory storing computer program, which causes the at least one processor and/or circuit to function as following units: a first obtaining unit configured to obtain a first lookup table (LUT) for a predetermined format conversion and applying an effect of desired color conversion, a second obtaining unit configured to obtain a second LUT for applying an effect of the predetermined format conversion, of an effect of the first LUT, a setting unit configured to set an influence of a LUT to be applied to a first image for processing, a combining unit configured to combine the first LUT and the second LUT on a basis of the influence to generate a third LUT, and a processing unit configured to perform color conversion on the first image using the third LUT.

The present invention in its second aspect provides an image processing apparatus comprising at least one processor and/or circuit, and at least one memory storing computer program, which causes the at least one processor and/or circuit to function as following units: an obtaining unit configured to obtain a first LUT for a predetermined format conversion and applying an effect of desired color conversion, a specifying unit configured to specify an effect of the predetermined format conversion, of an effect of the first LUT, a setting unit configured to set an influence of a LUT to be applied to a first image for processing; and a processing unit configured to generate a second image from the first image on a basis of the influence, the first LUT, and the predetermined format conversion.

The present invention in its third aspect provides an image processing method comprising obtaining a first LUT for a predetermined format conversion and applying an effect of desired color conversion, obtaining a second LUT for applying an effect of the predetermined format conversion, of an effect of the first LUT, setting an influence of a LUT to be applied to a first image for processing, combining the first LUT and the second LUT on a basis of the influence to generate a third LUT, and performing color conversion on the first image using the third LUT.

The present invention in its fourth aspect provides an image processing method comprising obtaining a first LUT for a predetermined format conversion and applying an effect of desired color conversion, specifying an effect of the predetermined format conversion, of an effect of the first LUT, setting an influence of a LUT to be applied to a first image for processing, and generating a second image from the first image on a basis of the influence, the first LUT, and the predetermined format conversion.

The present invention in its fifth aspect provides a computer-readable storage medium storing a program configured to cause a computer to perform the image processing method of the third aspect.

The present invention in its sixth aspect provides a computer-readable storage medium storing a program configured to cause a computer to perform the image processing method of the fourth aspect.

Further features of the present invention will become apparent from the following description of exemplary embodiments (with reference to the attached drawings).

BRIEF DESCRIPTION OF THE DRAWINGS

FIG. 2 is a block diagram illustrating an internal configuration of an image processing unit 24 according to the first embodiment.

FIG. 3 is a flowchart illustrating the flow of processing according to the first embodiment.

FIGS. 4A and 4B are diagrams illustrating examples of LUT data according to the first embodiment.

DESCRIPTION OF THE EMBODIMENTS

Figure 1:
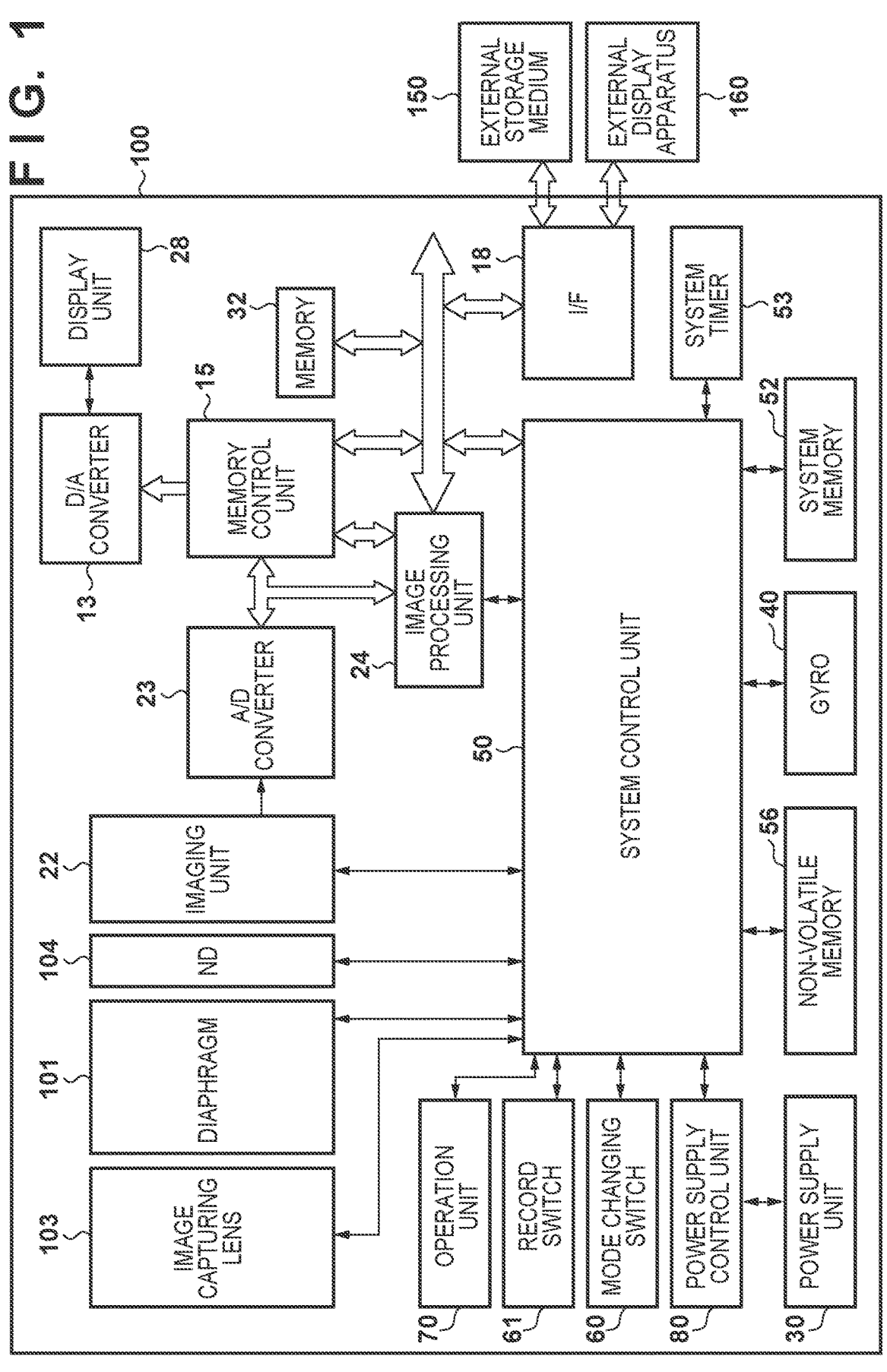
FIG. 1 is a block diagram illustrating an internal configuration of an imaging apparatus according to a first embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

FIG. 1 is a block configuration diagram of an imaging apparatus 100 of the first embodiment. The imaging apparatus can be applied to not only a so-called digital camera but also to a smartphone or a tablet device, a medical device, and industrial equipment with an image capture function, for example. Referring to FIG. 1, an image capturing lens 103 includes a lens group including a zoom lens, a focus lens, and a shift lens and focuses an object image on the imaging plane of an imaging unit 22. A diaphragm 101 is used for light amount adjustment, and neutral density (ND) 104 is an ND filter for reducing light. The imaging unit 22 is configured of a CCD or CMOS element, or the like, for converting an optical image into an electrical signal and includes a plurality of image sensors in a two-dimensional array on the imaging plane. The imaging unit 22 also has functions such as controlling accumulate by an electronic shutter, changing analog gain, changing read speed, and the like. An A/D converter 23 converts an analog signal output from the imaging unit 22 into a digital signal.

An image processing unit 24 executing processing such as predetermined pixel interpolation processing on image data from the A/D converter 23 or image data from a memory control unit 15, resize processing such as reduction processing, detection processing for brightness information, color information, characteristic object, or the like, color conversion processing, gamma correction processing, digital gain addition processing, and the like. Image processing by a dedicated operation circuit, image processing by an LUT applying circuit, and the like, are included as methods for such image processing. Also, the image processing unit 24 executes a predetermined operation processing using the captured image data and transmits the operation result to a system control unit 50.

The system control unit 50 performs exposure control, distance measuring control, white balance control, and the like, on the basis of the operation result received from the image processing unit 24. In this manner, through-the-lens (TTL) type auto focus (AF) processing, auto exposure (AE) processing, automatic white balance (AWB) processing, and the like, are executed. The system control unit 50 operates the shift lens of the image capturing lens 103 or the image processing unit 24 offsets the image to perform image blur correction due to movement or a change in the orientation of the imaging apparatus 100 due to shaking, or the like, detected by a gyro 40.

Output data from the A/D converter 23 is directly written on a memory 32 via the image processing unit 24 and the memory control unit 15. The memory 32 stores image data of an image captured by the imaging unit 22 and converted into digital data by the A/D converter 23, image data for displaying on a display unit 28, and the like. Also, the memory 32 is used for temporarily storing images subjected to image processing by the image processing unit 24, returned again the image processing unit 24, and having another image processing applied to them. The memory 32 is provided with enough storage capacity to store video and audio of a predetermined amount of time.

Also, the memory 32 also functions as memory (video memory) for image display. A D/A converter 13 converts data for image display stored in the memory 32 into an analog signal and supplies the analog signal to the display unit 28. In this manner, the image data for display written on the memory 32 is displayed by the display unit 28 via the D/A converter 13. The display unit 28 performs display corresponding to the analog signal from the D/A converter 13 on a display device such as an LCD, or the like. By using the D/A converter 13 to analog-convert the digital signals obtained via A/D conversion by the A/D converter 23 and accumulated in the memory 32, and successively transferring and displaying the signals on the display unit 28, an electronic viewfinder can be implemented and through-the-lens image can be performed.

A non-volatile memory 56 is a memory that is electrically erasable and recordable, and EEPROM may be used, for example. Constants, programs, and the like, for operation of the system control unit 50 are stored in the non-volatile memory 56. Herein, programs refer to programs for executing the various flowcharts described below.

The system control unit 50 controls the entire imaging apparatus 100. By executing the programs recorded on the non-volatile memory 56 described above, the various types of processing of the present embodiment described below are executed. Constants and variables for operation of the system control unit 50 and programs read out from the non-volatile memory 56 are deployed on a system memory 52 such as RAM. Also, the system control unit 50 controls the memory 32, the D/A converter 13, the display unit 28, and the like, to perform display control.

A system timer 53 is a time measuring unit that measures the time used by the various controls, the time of a built-in timer, and the like. A mode changing switch 60, a record switch 61, and an operation unit 70 are operational units for relaying the input of instructions from the user to the system control unit 50.

The mode changing switch 60 notifies the system control unit 50 of the operation mode from among a video recording mode, a still image recording mode, a playback mode, and the like. The system control unit 50, upon receiving this notification, executes processing to transition to the corresponding operation mode. Also, the video recording mode and the still image recording mode include more detailed modes such as an automatic image capturing mode, an automatic scene determining mode, a manual mode, various scene modes with imaging settings for each imaging scene, a program AE mode, a custom mode, and the like. The user can operate the mode changing switch 60 to directly switch to any of the modes included in the video capturing mode. Alternatively, after switching to the video capturing mode via the mode changing switch 60, the user may switch to any of the modes included in the video capturing mode via a different operation member. The record switch 61 is a switch for switching between an imaging standby state (OFF) and an imaging state (ON). When the record switch 61 is switched to ON, the system control unit 50 starts a series of operations from reading out a signal from the imaging unit 22 to writing video data to an external storage medium 150. When the record switch 61 is switch to OFF, the system control unit 50 ends the writing of video data to the external storage medium 150.

Each operation member of the operation unit 70 operate as various types of function buttons assigned as appropriate with functions for use in selection operations of the various function buttons displayed on the display unit 28 and scenarios. Example of function buttons include an end button, a return button, a next image button, a jump button, a filter button, a change attributes button, and the like. For example, a menu screen where various types of settings can be set by pressing the menu button is displayed on the display unit 28. The user can use the menu screen displayed on the display unit 28 and a left-right-up-down four-direction key and a SET button to intuitively set various settings.

A power supply control unit 80 includes a battery detection circuit, a DC-DC converter, and a switch circuit for switching blocks to be energized. The power supply control unit 80 detects whether a battery is installed, the type of battery, and the remaining battery level. Also, the power supply control unit 80 controls the DC-DC converter on the basis of the detection results and an instruction from the system control unit 50 and supplies the required voltages to various components including the external storage medium 150 at the required time.

A power supply unit 30 includes a primary battery, such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter. An I/F 18 is an interface with the external storage medium 150, such as a memory card or a hard disk, and an external display apparatus 160. The external storage medium 150 is a storage medium such as a memory card for recording captured images and exchanging data with the outside. A semiconductor memory or the like is used as the external storage medium 150.

Next, the configuration of the image processing unit 24 according to the present embodiment will be described with reference to FIG. 2. The captured image data input from the A/D converter 23 is input to a basic image processing unit 241. The processing executed by the basic image processing unit 241 includes gain processing to correct the brightness of image data, white balance processing to correct white balance, color correction processing to correct color, and the like. The processing executed by the image processing unit 24 includes edge enhancement processing for increasing the sharpness of an image, noise reduction processing for suppressing noise, and the like. The basic image processing unit 241 supplies the image data obtained via the image processing to a LUT processing unit 242.

The LUT processing unit 242 applies LUT data to the image data input from the basic image processing unit 241 and performs signal conversion. The LUT processing unit 242 according to the present embodiment can perform conversion using an influence change LUT data 504 generated on the basis of the influence instructed by influence 503. The influence change LUT data 504 is generated from the following information. This includes user input LUT data 501 input by a user operation targeted for user use, format conversion LUT data 502 corresponding to the format conversion included in the user input LUT data 501, and the influence 503 of these (described below in detail). The LUT processing unit 242 outputs the image data obtained via conversion by the influence change LUT data 504 to the memory 32 or the I/F 18.

Herein, user input LUT data refers to an input to the imaging apparatus 100 by a user operation of LUT data held external to the imaging apparatus 100. For example, the website of a camera manufacturer provides various LUTs catering for the image quality and atmosphere desired by the user. There are also applications that allow a user to create a LUT by themselves. The user can use a PC, or the like, store a provided LUT in the external storage medium 150, and connect the external storage medium 150 to the imaging apparatus 100 to input new LUT data into the imaging apparatus 100. Note that the LUT input method is not limited to this example, and, if the I/F 18 has a network I/F function, for example, a LUT may be input via a network on the basis of a user operation. Also, the imaging apparatus 100 may have a function for registering (inputting) a LUT generated on the basis of a user operation as a new LUT.

Next, the processing according to the present embodiment will be described with reference to the flowchart of FIG. 3. Note that, in the following description, the external storage medium 150 already stores the user input LUT data desired by the user.

In S31, the system control unit 50 reads out the user input LUT data 501 stored in the external storage medium 150 to the system memory 52 via the I/F 18. The user input LUT data 501 is an LUT representing any image conversion processing the user wishes to apply and is stored as text data or binary data. The user input LUT data 501 may be a one-dimensional LUT for applying the same conversion processing on each of the RGB signals or may be a three-dimensional LUT for inputting and outputting vectors with the three elements of RBG signals. Also, the color space defining the conversion is not limited to RGB, and any color space such as YUV or Lab may be used. In the present embodiment described herein, it is assumed that the LUT used defining conversion in a three-dimensional RGB space.

In S32, the system control unit 50 obtains format conversion information of the user input LUT data 501 input in S31. Normally, for the LUT, the values of the table are generated using not only an operation for simply changing (look conversion, also referred to as image generation) the hue/tint/tone/shade or feel, but also, using an operation for a specific format conversion. Herein, format refers to information representing what gamma/color gamut an image should be treated as. For example, an image based on ITU-R BT.709 is converted into numerical data by a gamma or color gamut formula defined in ITU-R BT.709. Thus, a display, or the like, based on ITU-R BT.709 displays an image on the basis of the gamma and color gamut defined in ITU-R BT.709. In the present step, the system control unit 50 obtains two pieces of information, a conversion source format (first partial format conversion) specified by the user input LUT data 501 and a conversion destination format (second partial format conversion) and obtains format conversion information from these pieces of information.

First, in the case of an imaging apparatus, such as in the present embodiment, it is plausible that assume that the user has preset the conversion source format information via the operation unit 70, and thus the conversion source format information can be obtained from the system memory 52. In a case when there is only one format that can image, the user does not perform setting via the operation unit 70, but, because the format is decided, this information corresponds to the conversion source format information. Instead of an imaging apparatus, in the case of software, or the like, that handles images captured by an imaging apparatus, the information may be plausibly obtained from the metadata of the images, designated by the user, or the like.

Conversion destination format information is obtained by the user inputting it via the operation unit 70 as attached information when inputting the user input LUT data 501 or by reading information added to the user input LUT data 501.

In S33, the system control unit 50 generates the format conversion LUT data 502 from the format conversion information obtained in S32.

Consider an example in which the format conversion information indicates a conversion from gamma/color gamut based on perceptual quantization (PQ) of ITU-R BT.2100 to gamma/color gamut based on ITU-R BT.709. This conversion is implemented by canceling PQ gamma, performing color gamut conversion, and converting to BT.709 gamma. Accordingly, the format conversion LUT data 502 can be generated by the following processes.

(1) Apply an inverse conversion of opto-electronic transfer function (OETF) of PQ based on ITU-R BT.2100 on the unconverted LUT data with the same number of elements as the LUT data obtained in S31.

(2) Obtain a matrix for converting the PQ color gamut based on ITU-R BT.2100 to a color gamut based on ITU-R BT.709 and multiplying this with the result of 1).

(3) Apply OETF based on ITU-R BT.709 to the result of 2).

(1) to (3) described above are processes for generating the format conversion LUT data 502 for gamma conversion via OETF, but gamma conversion may be performed via a method using electronic-opto transfer function (EOTF).

In S34, the system control unit 50 obtains the influence representing the level of the result for the image of the user input LUT data 501. This is obtained by user input via the operation unit 70. An initial influence added to the LUT data obtained in S31 may also be obtained. The influence as a user input or as information attached to the LUT data may be represented in any form. For example, a value from 0% to 100% may be used, or it may be represented by low, medium, and high. In the present embodiment, the user input LUT data 501 is the maximum result (1.0 or 100%), and these are converted to a numerical value 0 (0%) to 1.0 (100%) and obtained as the influence. The intention of the influence in the present embodiment relates to the degree of the effect of the look conversion. In other words, the user sets the influence according to their intention, namely, whether they want to increase or to decrease the effect of the look conversion, to keep the effect to approximately 50%, to apply the effect 100%.

In S35, the system control unit 50 generates the influence change LUT data 504 on the basis of the influence obtained in S34, the user input LUT data 501 obtained in S31, and the format conversion LUT data 502 obtained in S33. In the present embodiment, linear interpolation of the LUT data obtained in S31 and the format conversion LUT data 502 obtained in S33 is performed on the basis of the influence obtained in S34. This method of combining both LUTs will now be described.

FIGS. 4A and 4B are examples of LUT data. FIG. 4A illustrates the format conversion LUT data 502 generated in S33, and FIG. 4B illustrates the user input LUT data 501 obtained in S31. Linear interpolation is performed for all of the rows, but the following description will focus on the rows indicated by reference numerals 401 and 402. It should be understood that the same applies to the other rows.

If the influence obtained in S34 is defined as α (a value from 0 to 1 is held internally), then the linear interpolation results R(α), G(α), B(α) of the rows indicated by reference numerals 401 and 402 are as follows.

$$R(\alpha) = 0.0004 \times (1 - \alpha) + 0.8624 \times \alpha = 0.8620\alpha + 0.0004$$

$$G(\alpha) = 0.3450 \times (1 - \alpha) + 1.0000 \times \alpha = 0.6550\alpha + 0.3450$$

$$B(\alpha) = 0.0198 \times (1 - \alpha) + 0.8068 \times \alpha = 0.7870\alpha + 0.0198$$

Thus, if α=0.6, then R=0.5175 . . . , G=0.7379 . . . , and B=0.4290 . . . . Also, if α=0.3, then R=0.2590 . . . , G=0.5414 . . . , and B=0.2559 . . . . By performing this calculation for all of the rows, the influence change LUT data 504 can be generated. This calculation indicates that, of the user input LUT data 501 obtained in S31, the result of the look conversion is changed to the result of multiplying the influence a, but the effect of format conversion is not changed from the initial effect. In this manner, the influence change LUT data 504 corresponds to LUT data with only the effect of look conversion adjusted by influence.

In S36, the system control unit 50 causes the LUT processing unit 242 to apply the influence change LUT data 504 generated in S35 to the LUT processing unit 242 and to perform image conversion. In other words, the LUT processing unit 242 generates image data with the effect of the influence change LUT data 504 applied to the image data for processing supplied from the basic image processing unit 241 and outputs this. Thereafter, the system control unit 50 stores the image data output from the LUT processing unit 242 in the external storage medium 150 as a file and displays it on the display unit 28 or the external display apparatus 160.

In the present embodiment, by combining the LUT data input by the user on the basis of the influence desired by the user and the LUT data generated from the corresponding format conversion information, an influence change LUT is generated. This method will be described below. According to the present embodiment, the influence change LUT can maintain the format conversion effect and change only the look conversion influence. Thus, an inappropriate image format can be avoided when the influence is lowered, and a natural image with only the LUT conversion levels being adjusted can be obtained.

Second Embodiment

In the method according to the first embodiment described above, a direct method of interpolation is performed according to LUT data input by a user and LUT data corresponding to a format conversion included in LUT data input by the user according to an influence. However, in the first embodiment, since interpolation is performed in the conversion destination format space, the state of the look conversion when the influence changes may vary depending on the format. Regarding this, in the second embodiment, by performing interpolation using influence in a de-gamma space, even if the conversion destination format is different, a noticeable difference in how the obtained image looks is not produced. This method will be described below.

The overall flow is similar to that in the first embodiment. Thus, as in the first embodiment, the flowchart of FIG. 3 and the block diagram of FIG. 2 will be referenced. Also, the processing from S31 to S34 in FIG. 3 according to the second embodiment is similar to that from S31 to S34 in the first embodiment described above, and thus these will not be described.

In S35, the system control unit 50 generates influence change LUT data 504 on the basis of the format conversion LUT data 502, the user input LUT data 501, and the influence 503. However, in a difference from the first embodiment, the system control unit 50 performs interpolation on the basis of the influence in a state without the conversion processing from each LUT to the conversion destination format and, after interpolation, applies conversion processing to the conversion destination format again. Specific examples are described below.

Consider an example in which the conversion source format of the user input LUT data 501 is based on PQ of ITU-R BT.2100, and the conversion destination format is a two-pattern LUT based on hybrid log gamma (HLG) of ITU-R BT.2100 and based on ITU-R BT.709. Here, the EOTF of PQ based on ITU-R BT.2100 is represented by $F_{PQ}$, the EOTF of HLG based on ITU-R BT.2100 is represented by $F_{HLG}$, and the EOTF based on ITU-R BT.709 is represented by $F_{709}$. Also, the conversion from XYZ color space by a color gamut definition of PQ based on ITU-R BT.2100 to RGB color space is represented by $M_{PQ}$, the conversion from XYZ color space by a color gamut definition of HLG of ITU-R BT.2100 to RGB color space is represented by $M_{HLG}$, and the conversion from XYZ color space by color gamut definition of ITU-R BT.709 to RGB color space is represented by $M_{709}$. Accordingly, when the pixel value of the input image is defined as x, conversion from PQ of ITU-R BT.2100 to HLG of ITU-R BT.2100 and from PQ of ITU-R BT.2100 to ITU-R BT.709 is as follows.

In the case of conversion from PQ to HLG $$F_{HLG}^{-1}\left(M_{HLG}\left(M_{PQ}^{-1}(F_{PQ}(x))\right)\right)$$

In the case of conversion from PQ to BT.709

$$F_{709}^{-1}\left(M_{709}\left(M_{PQ}^{-1}(F_{PQ}(x))\right)\right)$$

The format conversion LUT data 502 is in accordance with the formulas described above. Also, since the user input LUT data 501 is obtained by adding a discretionary conversion processing to the format conversion described above, when the discretionary conversion processing is represented by C, the user input LUT data 501 is as follows.

In the case of conversion from PQ to HLG $$F_{HLG}^{-1}\left(M_{HLG}\left(C\left(M_{PQ}^{-1}(F_{PQ}(x))\right)\right)\right)$$

In the case of conversion from PQ to BT.709

$$F_{709}^{-1}\left(M_{709}\left(C\left(M_{PQ}^{-1}(F_{PQ}(x))\right)\right)\right)$$

When the conversion processing other than the discretionary conversion processing C is reversible, regardless of what calculation order is actually used to create the user input LUT data 501, as described above, it can be considered to be after $M_{PQ}^{-1}$. In some cases, in the actual definition, irreversible processing such as taking less than zero as zero is included. Thus, by substituting them with a processing without these, the user input LUT data 501 can be considered to be calculated in the order described above. As described above, in a case when C of the conversion from PQ to HLG and from PQ to BT.709 match, the look of each image is substantially the same due to the images applied with the user input LUT data 501 each being viewed in a respectively suitable viewing environment. This is because when viewing in a suitable viewing environment, $$F_{HLG}^{-1}(M_{HLG}(x)),\ F_{709}^{-1}(M_{709}(x))$$

are canceled by the display apparatus, and both are treated as $$C\left(M_{PQ}^{-1}(F_{PQ}(x))\right).$$

At this time, the influence change LUT data 504 in the case of interpolation being performed using influence as α and with the conversion destination format canceled, and thereafter conversion to the conversion destination format being applied is as follows.

In the case of conversion from PQ to HLG $$F_{HLG}^{-1}\left(M_{HLG}\left(\alpha C\left(M_{PQ}^{-1}(F_{PQ}(x))\right)+(1-\alpha)\left(M_{PQ}^{-1}(F_{PQ}(x))\right)\right)\right)$$

In the case of conversion from PQ to BT.709

$$F_{709}^{-1}\left(M_{709}\left(\alpha C\left(M_{PQ}^{-1}(F_{PQ}(x))\right)+(1-\alpha)\left(M_{PQ}^{-1}(F_{PQ}(x))\right)\right)\right)$$

In both cases, $$\alpha C\left(M_{PQ}^{-1}(F_{PQ}(x))\right)+(1-\alpha)\left(M_{PQ}^{-1}(F_{PQ}(x))\right)$$

is treated as in an appropriate viewing environment, and thus even when the LUT conversion level is adjusted by a discretionary influence a, adjustment where both images look substantially the same regardless of the conversion destination format can be achieved.

In S36, as in the first embodiment, the system control unit 50 applies the influence change LUT data 504 generated in S35 to the LUT processing unit 242 and causes the LUT processing unit 242 to perform LUT conversion on the image data supplied from the basic image processing unit 241.

In the LUT application method according to the present second embodiment described above, interpolation of both LUTs is performed without conversion processing to the conversion destination format, and, thereafter, the influence change LUT is generated by re-applying conversion processing to the conversion destination format. According to the present second embodiment, with a plurality of user input LUTs for converting to the same look but with different conversion destination formats, a user can be provided with an influence change function that produces substantially matching looks when the influence is the same.

Third Embodiment

In the method according to the first embodiment described above, influence change is performed by performing interpolation on both LUTs. However, a method of achieving this by the interpolation of both images can also be used. This method according to the third embodiment will now be described with reference to the block diagram of FIG. 5.

Figure 2:
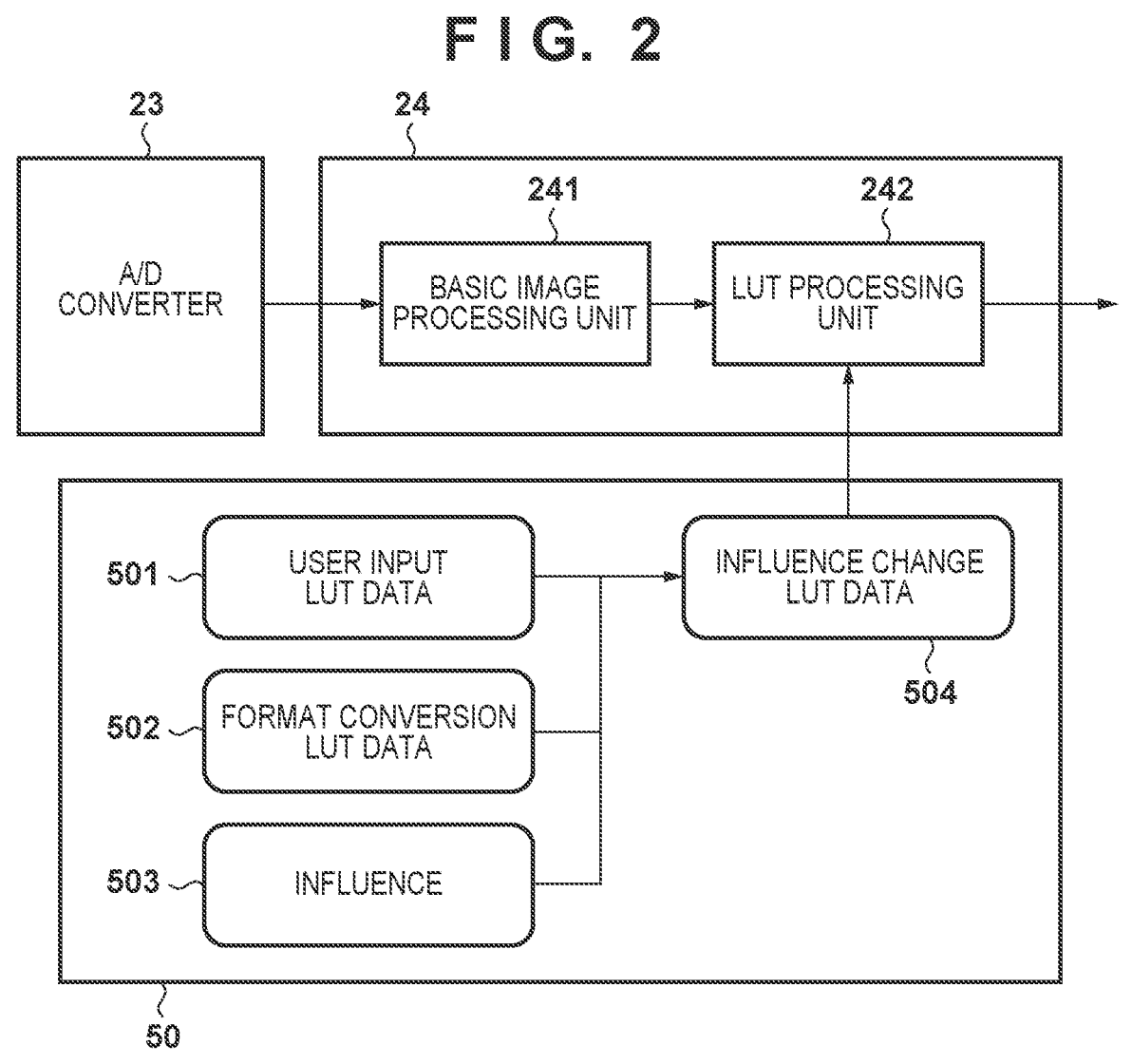
Figure 5:
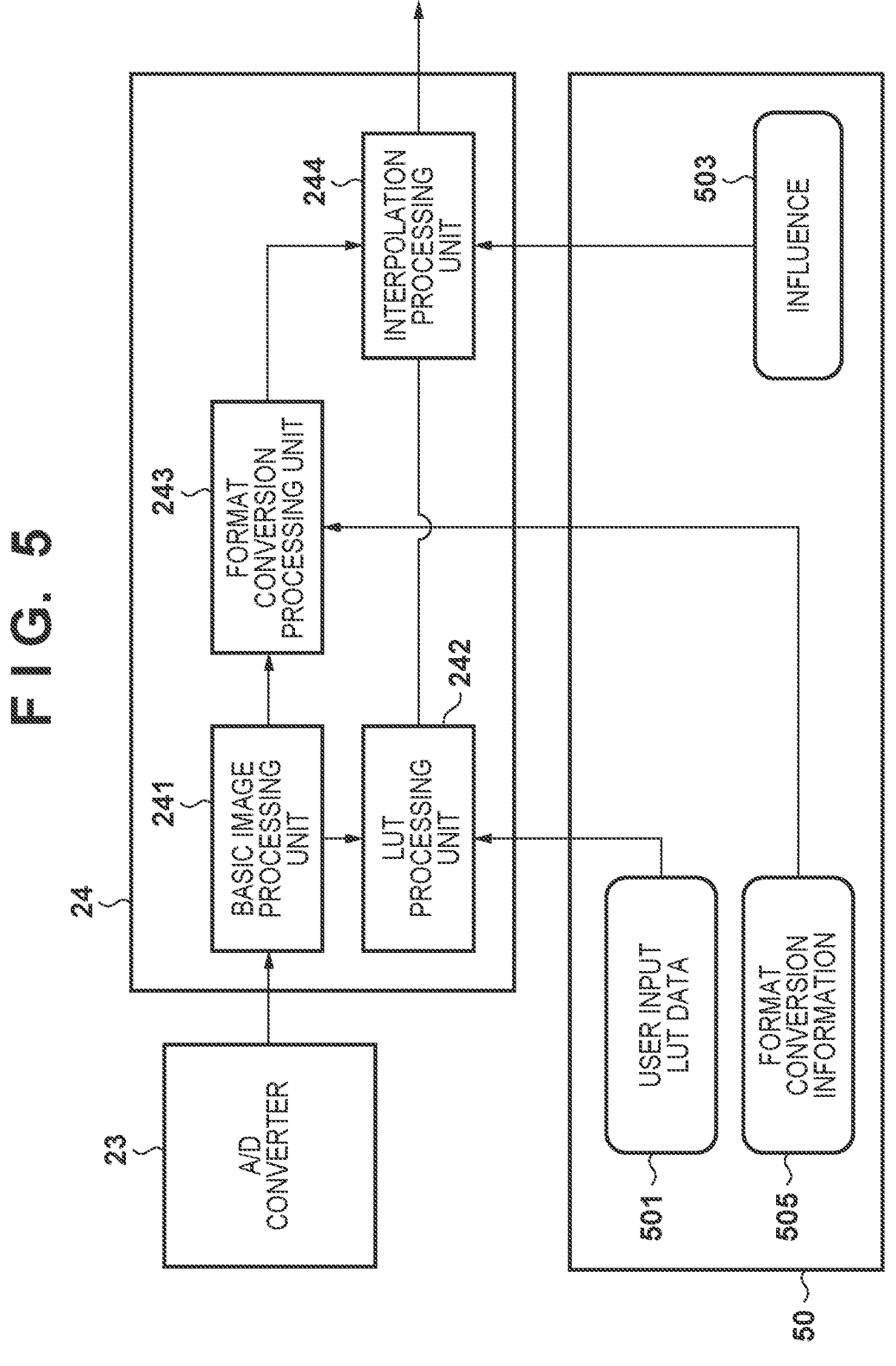
FIG. 5 is a block diagram illustrating an internal configuration of an image processing unit according to a second embodiment.

The A/D converter 23 in FIG. 5 is similar to the A/D converter 23 in FIG. 2 and thus will not be described. The image processing unit 24 in FIG. 5 includes a format conversion processing unit 243. The format conversion processing unit 243 performs format conversion processing based on format conversion information 505 on an image input from the basic image processing unit 241. As described in the first embodiment, if the conversion source format and the conversion destination format are known, conversion from the conversion source format to the conversion destination format can be performed via an operation. In the first embodiment, the format conversion LUT data 502 is generated by such an operation. However, the format conversion processing unit 243 can be used to convert the image itself input from the basic image processing unit 241. Also, the LUT processing unit 242 is a block for performing conversion processing using a LUT on an image input from the basic image processing unit 241 as in FIG. 2, but, in the present third embodiment, different from FIG. 2, the user input LUT data 501 is applied as is. Then, an interpolation processing unit 244 performs combining via interpolation based on the influence 503 of images input from the format conversion processing unit 243 and the LUT processing unit 242. Using such a configuration, a format conversion image output from the format conversion processing unit 243 and an LUT applied image output from the LUT processing unit 242 are combined via interpolation at the interpolation processing unit 244. In this manner, an image substantially similar to that of the first embodiment can be obtained from the image processing unit 24. Compared to the first embodiment, an operation is used instead of processing using an LUT for format conversion resulting in a more accurate calculation. Thus, image failure can be suppressed even when the influence is particularly low and the LUT grid number is low.

Also, in the first and second embodiments described above, the format conversion LUT data 502 is generated on the basis of only the format conversion information. However, other conversion processing may also be included. For example, in a case when an image based on PQ of ITU-R BT.2100 is format converted to an image based on ITU-R BT.709, by simply converting, overexposure and color saturation often occur. Such overexposure and color saturation can often reduce the quality of images, processing to alleviate or reduce overexposure and color saturation can be plausibly included in the format conversion LUT data 502. For example, gray level compression processing for overexposure may be included. Also, processing known as gamut mapping for mapping colors outside the color gamut to colors inside the color gamut may be included for color saturation. By including such processing, the conversion becomes different from a simply format conversion. However, as long as the majority is not greatly different from a simply format conversion, the quality of the image obtained can be improved without making the user think something is off. Other processing may also be included, not only gray level compression processing and gamut mapping.

Furthermore, in the first and second embodiments described above, the format conversion LUT data 502 is generated via an operation based on the format conversion information. However, the format conversion information and the format conversion LUT data 502 may be associated together in advance and stored in the non-volatile memory 56 and then retrieved to be used.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor and/or a circuit; and
   at least one memory storing a computer program, which causes the at least one processor and/or the circuit to function as the following units:
   a first obtaining unit configured to obtain a first lookup table (LUT) for a predetermined format conversion and applying an effect of a desired color conversion;
   a second obtaining unit configured to obtain a second LUT for applying an effect of the predetermined format conversion, of an effect of the first LUT;
   a setting unit configured to set an influence of an LUT to be applied to a first image for processing;
   a combining unit configured to combine the first LUT and the second LUT on a basis of the influence to generate a third LUT; and
   a processing unit configured to perform color conversion on the first image using the third LUT,

wherein the predetermined format conversion includes a first partial format conversion and a second partial format conversion, and the combining unit generates a fourth LUT without the second partial format conversion from the first LUT and a fifth LUT, without the second partial format conversion from the second LUT, combines the fourth LUT and the fifth LUT on a basis of the influence, and generates the third LUT by applying the second partial format conversion after the combining.

2. The image processing apparatus according to claim 1, wherein the second LUT is an LUT for applying an effect of conversion processing different from the predetermined format conversion in addition to an effect of the predetermined format conversion.

3. The image processing apparatus according to claim 1, wherein the predetermined format conversion is specified by an input from a user.

4. The image processing apparatus according to claim 1, wherein the predetermined format conversion is specified from information attached to the first LUT.

5. The image processing apparatus according to claim 1, further comprising an imaging unit configured to obtain the first image.

6. An image processing apparatus comprising:

at least one processor and/or a circuit; and at least one memory storing computer program, which causes the at least one processor and/or circuit to function as the following units:

an obtaining unit configured to obtain a first lookup table (LUT) for a predetermined format conversion and applying an effect of a desired color conversion;

a specifying unit configured to specify an effect of the predetermined format conversion, of an effect of the first LUT;

a setting unit configured to set an influence of a LUT to be applied to a first image for processing; and a processing unit configured to generate a second image from the first image on a basis of the influence, the first LUT, and the predetermined format conversion, wherein the processing unit combines a third image obtained by applying the first LUT to the first image and a fourth image obtained by applying an effect of the predetermined format conversion to the first image on a basis of the influence to generate the second image.

7. The image processing apparatus according to claim 6, further comprising an imaging unit configured to obtain the first image.

8. An image processing apparatus comprising:

at least one processor and/or a circuit; and at least one memory storing computer program, which causes the at least one processor and/or the circuit to function as the following units:

an obtaining unit configured to obtain a first lookup table (LUT) for a predetermined format conversion and applying an effect of a desired color conversion;

a specifying unit configured to specify an effect of the predetermined format conversion, of an effect of the first LUT;

a setting unit configured to set an influence of a LUT to be applied to a first image for processing; and a processing unit configured to generate a second image from the first image on a basis of the influence, the first LUT, and the predetermined format conversion, wherein the predetermined format conversion includes a first partial format conversion and a second partial format conversion, and the processing unit generates a third image obtained by applying a third LUT without the second partial format conversion to the first image from the first LUT and a fourth image obtained by applying a third partial format conversion without the second partial format conversion to the first image from the predetermined format conversion, generates a fifth image by combining the third image and the fourth image on a basis of the influence, and generates the second image by applying the second partial format conversion to the fifth image.

9. An image processing method comprising:

obtaining a first lookup table (LUT) for a predetermined format conversion and applying an effect of a desired color conversion;

obtaining a second LUT for applying an effect of the predetermined format conversion, of an effect of the first LUT;

setting an influence of an LUT to be applied to a first image for processing;

combining the first LUT and the second LUT on a basis of the influence to generate a third LUT; and performing color conversion on the first image using the third LUT, wherein the predetermined format conversion includes a first partial format conversion and a second partial format conversion, and the combining includes generating a fourth LUT without the second partial format conversion from the first LUT and a fifth LUT without the second partial format conversion from the second LUT, combining the fourth LUT and the fifth LUT on a basis of the influence, and generating the third LUT by applying the second partial format conversion after the combining.

10. A non-transitory computer-readable storage medium storing a program configured to cause a computer to perform the image processing method according to claim 9.

11. An image processing method comprising:

obtaining a first lookup table (LUT) for a predetermined format conversion and applying an effect of a desired color conversion;

specifying an effect of the predetermined format conversion, of an effect of the first LUT;

setting an influence of a LUT to be applied to a first image for processing; and generating a second image from the first image on a basis of the influence, the first LUT, and the predetermined format conversion, wherein the generating combines a third image obtained by applying the first LUT to the first image and a fourth image obtained by applying an effect of the predetermined format conversion to the first image on a basis of the influence to generate the second image.

12. A non-transitory computer-readable storage medium storing a program configured to cause a computer to perform the image processing method according to claim 11.

13. An image processing method comprising:

obtaining a first lookup table (LUT) for a predetermined format conversion and applying an effect of a desired color conversion;

specifying an effect of the predetermined format conversion, of an effect of the first LUT;

setting an influence of an LUT to be applied to a first image for processing; and generating a second image from the first image on a basis of the influence, the first LUT, and the predetermined format conversion, wherein the predetermined format conversion includes a first partial format conversion and a second partial format conversion, and the generating includes generating a third image obtained by applying a third LUT without the second partial format conversion to the first image from the first LUT and a fourth image obtained by applying a third partial format conversion without the second partial format conversion to the first image from the predetermined format conversion, generating a fifth image by combining the third image and the fourth image on a basis of the influence, and generating the second image by applying the second partial format conversion to the fifth image.

14. A non-transitory computer-readable storage medium storing a program configured to cause a computer to perform the image processing method according to claim 13.

* * * * *